United States Patent Office 3,120,515
Patented Feb. 4, 1964

3,120,515
5-CYANO STEROIDS, THEIR PREPARATION, AND DERIVATIVES THEREOF
Robert G. Christiansen, Rensselaer, N.Y., assignor to Sterling Drug Inc., New York, N.Y., a corporation of Delaware
No Drawing. Filed May 31, 1962, Ser. No. 198,751
25 Claims. (Cl. 260—239.5)

This invention relates to new steroid compounds derived from the addition of cyanide ion to $\Delta^4$-3-oxo steroids of the androstene and pregnene series, and to the preparation thereof.

The addition of cyanide ion to $\Delta^4$-3-oxo steroids may be depicted as follows:

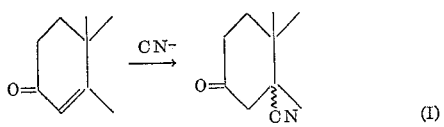

The product comprises a mixture of epimeric 5-cyano steroids. The reaction takes place by heating the $\Delta^4$-3-oxo steroid with an excess of a water-soluble metal cyanide in a solvent mixture containing water and water-miscible organic solvents. The 1,4-addition reaction placing the cyano groups in the 5-position was confirmed by absorption spectra data.

A preferred aspect of the invention comprises compounds of the formula

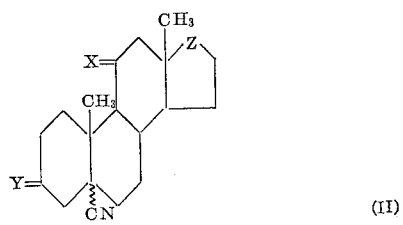

wherein X is a member of the group consisting of $H_2$, (H)(OH) and O;
Y is a member of the group consisting of (H)(OH) and (H)(OAcyl);
and Z is a member of the group consisting of

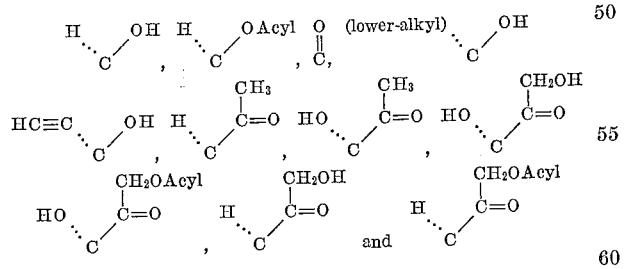

The acyl radicals are preferably derived from carboxylic acids having from one to about ten carbon atoms, conventionally employed in the steroid art, and having a molecular weight less than about 200. Representative of the acyl radicals which can be present are lower-alkanoyl radicals, e.g., formyl, acetyl, propionyl, butyryl, isobutyryl, caproyl, heptanoyl, octanoyl, trimethylacetyl, and the like; carboxy-lower-alkanoyl radicals, e.g., succinyl ($\beta$-carboxypropionyl); cycloalkyl-lower-alkanoyl radicals, e.g., $\beta$-cyclopentylpropionyl, $\beta$-cyclohexylpropionyl, and the like; monocarbocyclic aroyl radicals, e.g., benzoyl, p-toluyl, p-nitrobenzoyl, 3,4,5-trimethoxybenzoyl, and the like; monocarbocyclic aryl-lower-alkanoyl or -alkenoyl radicals, such as phenylacetyl, $\beta$-phenylpropionyl, cinnamoyl, and the like; and monocarbocyclic aryloxy-lower-alkanoyl radicals, such as p-chlorophenoxyacetyl, and the like.

The compounds of Formula II are prepared by heating a compound having the formula

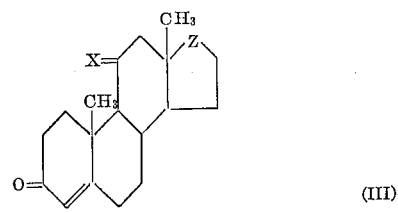

wherein X and Z have the meanings given above with a water-soluble metal cyanide in an aqueous-organic solvent. The initial product formed is a compound of Formula II where Y is O. If compounds where Y is (H)(OH) are desired, they can be prepared by sodium borohydride reduction of the 3-oxo compounds. Compounds where Y is (H)(OAcyl) can be prepared by esterification of compounds where Y is (H)(OH) by conventional procedures, as by heating the carbinol with an excess of the appropriate acid halide or acid anhydride in the presence of pyridine.

The product of the reaction of a 3-oxo steroid of Formula III and a cyanide is a mixture of the 5$\alpha$- and 5$\beta$-cyano epimers. The two epimers can be separated by physical methods, as by fractional crystallization.

The reduction of compounds of Formula II where Y is O with sodium borohydride gives a mixture of the 3$\alpha$-hydroxy and 3$\beta$-hydroxy epimers. These epimers can be separated by physical methods or by making use of the fact that mild treatment of the mixture with acid converts the epimer having the 3-hydroxy group and the 5-cyano group in the same conformation into a basic (acid-soluble) iminolactone (Formula V below), whereas the other epimer is unaffected.

Another preferred aspect of the invention comprises compounds of the formula

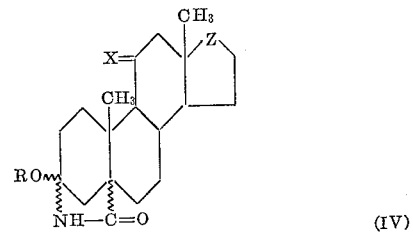

wherein X and Z have the meanings given above, and R is selected from the group consisting of hydrogen and Acyl. These are prepared by treating a compound of Formula II (Y is O) with a strong base such as sodium or potassium hydroxide in an aqueous-organic medium. Any acyl groups present will be hydrolyzed during the process, but they can be reintroduced by conventional esterification procedures.

Further preferred aspects of the invention relate to conversion products of compounds of Formula II where Y is (H)(OH), as represented by the following flow-sheet. The use of wavy lines in the formulas and of the symbol $\xi$ in the names of the compounds is indicative of the fact that both stereochemical forms at the position indicated are contemplated and can be produced by the processes of the invention.

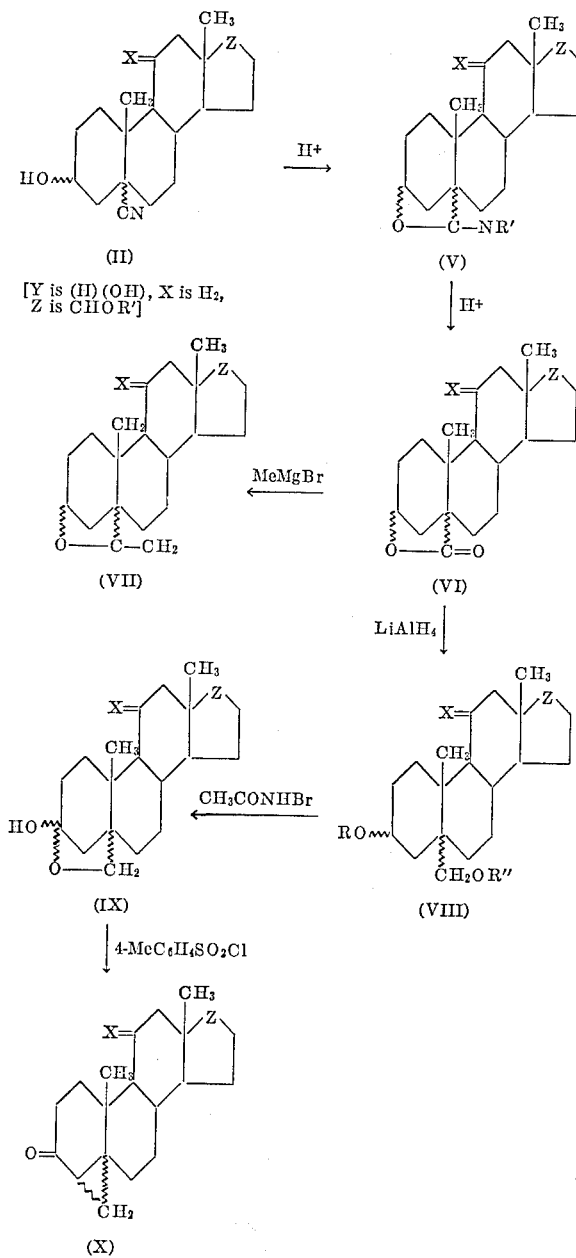

In the above formulas, R, R' and R'' stand for hydrogen or Acyl; and X, Z and Acyl have the meanings given hereinabove.

A 5-cyano-3-hydroxy-steroid of Formula II (an epimer in which the 3-hydroxy and 5-cyano groups have the same conformation) when heated with a strong acid is first cyclized to a 3,5-iminolactone (V, R' is H) and then hydrolyzed to a 3,5-lactone (VI). A 3,5-lactone (VI) can be caused to react with methylmagnesium halide to give a 3,5-epoxyvinylidene compound (VII). A 3,5-lactone (VI) can be reduced with lithium aluminum hydride to give a 3-hydroxy-5-hydroxymethyl steroid (VIII, R and R'' are H), which upon oxidation with N-bromoacetamide is converted to a 3-hydroxy-3,5-epoxymethano compound (IX). A 3-hydroxy-3,5-epoxymethano compound (IX) can then be converted to a 3-oxo-4,5-methano compound by heating the former with p-toluenesulfonyl chloride in pyridine. The compounds of Formulas V–X, inclusive, where R, R' and/or R'' are Acyl can be prepared from the corresponding carbinols by conventional acylation procedures.

It will be apparent to the skilled steroid chemist that certain procedural modifications are desirable to avoid side reactions at points in the steroid molecule other than in Ring A. For example, an oxo group at C–20 in compounds of the pregnane series can be protected against a Grignard reagent or against reduction by ketalization. Furthermore, although compounds wherein Z is (lower-alkyl)C(OH) cannot tolerate acid treatment without undergoing dehydration and rearrangement, it is possible to prepare such compounds by treating the corresponding compounds where Z is C=O with a methyl Grignard reagent.

The present invention has provided a new class of steroid compounds, and these compounds have now been made available for study as to their endocrinological and pharmacological activities. Compounds of the invention have been subjected to endocrinological and pharmacological evaluation and the results have revealed the presence of useful properties, e.g., anabolic, estrogenic and antihypertensive activities. The processes and products of the invention are also useful in that they provide a means for introducing a carbon substituent in the 5-position of the steroid nucleus.

The structures of the compounds of the invention have been established by the modes of preparation, by elementary analysis, and by physical data, including infrared spectral data.

The following examples will illustrate the invention more fully without the latter being limited thereby.

EXAMPLE 1

5α-Cyanoandrostan-17β-Ol-3-One

[II; X is $H_2$, Y is O, Z is CH(OH-β)]

A mixture of 57.7 g. of testosterone, 19.5 g. of potassium cyanide, 50 ml. of water, 50 ml. of ethyl acetate and 200 ml. of methanol was refluxed for two hours. The reaction mixture was cooled and the solid which separated was collected by filtration, washed with a solvent mixture of methanol, water and ethyl acetate (4:1:1) to give 15.0 g. of 5α-cyanoandrostan-17β-ol-3-one which when recrystallized twice from methanol was obtained in the form of colorless needles, M.P. 239.6–240.4° C. (corr.); $[\alpha]_D^{25}=+42.3°$ (1% in chloroform); infrared absorption at 2.85, 3.41, 4.47, 5.80, 6.15, 6.80, 6.88 and 7.05μ.

5α-cyanoandrostan-17β-ol-3-one can be caused to react in the presence of pyridine with propionic anhydride, caproyl chloride, succinic anhydride, β-cyclohexylpropionic anhydride, benzoyl chloride, phenylacetyl chloride, cinnamoyl chloride, or p-chlorophenoxyacetyl chloride to give, respectively, 17β-propionoxy-5α-cyanoandrostan-3-one [II; X is $H_2$, Y is O, Z is CH(OCOCH$_2$CH$_3$-β)], 17β-cinnamoyloxy-5α-cyanoandrostan-3-one [II; X is $H_2$, Y is O, Z is CH(OCOCH$_2$CH$_2$CH$_2$CH$_2$CH$_3$-β)], 17β-(β-carboxypropionoxy)-5α-cyanoandrostan-3-one [II; X is $H_2$, Y is O, Z is CH(OCOCH$_2$CH$_2$COOH-β)], 17β-(β-cyclohexylpropionoxy)-5α-cyanoandrostan-3-one [II; X is $H_2$, Y is O, Z is CH(OCOCH$_2$CH$_2$C$_6$H$_{11}$-β)], 17β-benzoyloxy-5α-cyanoandrostan-3-one [II; X is $H_2$, Y is O, Z is CH(OCOC$_6$H$_5$-β)], 17β-phenylacetoxy-5α-cyanoandrostan-3-one

[II; X is $H_2$, Y is O, Z is CH(OCOCH$_2$C$_6$H$_5$-β)]

17β-cinnamoyloxy-5α-cyanandrostan-3-one [II; X is $H_2$, Y is O, Z is CH(OCOCH=CHC$_6$H$_5$-β)], or 17β-(p-chlorophenoxyacetoxy)-5α-cyanoandrostan-3-one [II; X is $H_2$, Y is O, Z is CH(OCOCH$_2$OC$_6$H$_4$Cl-β)].

EXAMPLE 2

5β-Cyanoandrostan-17β-Ol-3-One

[II; X is $H_2$, Y is O, Z is CH(OH-β)]

A mixture of 114.4 g. of testosterone, 39.0 g. of potassium cyanide, 100 ml. of water, 100 ml. of ethyl acetate and 400 ml. of methanol was refluxed for two hours. The reaction mixture was cooled and seeded with a trace of the 5α-cyanoandrostan-17β-ol-3-one obtained in Example 1, and placed in a refrigerator until thoroughly chilled. The mixture was filtered, and the filtrate was concentrated and the residue recrystallized four times from ethyl acetate to give 5β-cyanoandrostan-17β-ol-3-one in the form of colorless prisms, M.P. 211.6–213.4° C. (corr.), $[\alpha]_D^{25}=+20.3°$ (1% in chloroform); infrared absorption at 2.81, 3.40, 4.47 and 5.82μ.

EXAMPLE 3

*5ξ-Cyano-17α-Methylandrostan-17β-Ol-3-One (Isomer A)*

[II; X is $H_2$, Y is O, Z is C(OH-β)(CH$_3$-α)]

A mixture of 12.08 g. of 17α-methyl-4-androstan-17β-ol-3-one, 5.20 g. of potassium cyanide, 5 ml. of water, 5 ml. of ethyl acetate and 50 ml. of methanol was heated in a sealed tube on a steam bath for four hours. The reaction mixture was diluted with 1 liter of water, extracted three times with 250 ml. of methylene dichloride, and the extracts washed with water, dried over anhydrous magnesium sulfate and concentrated. The residue was dissolved in ether-methylene dichloride (9:1), chromatographed on a column of 500 ml. of silica gel, and the column was eluted with ether-methylene dichloride (9:1). The product thus obtained was recrystallized from ethyl acetate and from methanol to give 5ξ-cyano-17α-methylandrostan-17β-ol-3-one (Isomer A), M.P. 226.2–227.8° C. (corr.), $[\alpha]_D^{25}=+21.6°$ (1% in chloroform); ultraviolet maximum at 285 mμ (E=20); infrared absorption at 2.88, 4.48, 5.85 and 6.89μ.

5ξ-cyano-17α-methylandrostan-17β-ol-3-one (Isomer A) when administered subcutaneously to rats caused nitrogen retention indicating the presence of anabolic activity in the compound.

EXAMPLE 4

*5ξ-Cyano-17α-Methylandrostan-17β-Ol-3-One (Isomer B)*

[II; X is $H_2$, Y is O, Z is C(OH-β)(CH$_3$-α)]

17α-methyl-4-androsten-17β-ol-3-one (48.32 g.) was caused to react with 20.80 g. of potassium cyanide according to the procedure described above in Example 3. The crude reaction product was recrystallized from 100 ml. of methanol, the solid material (largely Isomer A) removed by filtration, and the filtrate concentrated to dryness. The residue from the filtrate was dissolved in ether-methylene dichloride (9:1) and chromatographed on 1000 g. of silica gel. The column was eluted with ether-methylene dichloride (9:1), and the product thus obtained was rechromatographed and eluted with ether-methylene dichloride-pentane (5:1:4), and the product recrystallized first from methanol and then repeatedly from acetonitrile to give 5ξ-cyano-17α-methylandrostan-17β-ol-3-one (Isomer B), M.P. 237.0–238.0° C. (corr.), $[\alpha]_D^{25}=-2.5°$ (1% in chloroform); infrared absorption at 2.87, 3.42, 4.48, 5.80 and 5.84μ.

EXAMPLE 5

5α-cyanopregnane-3,20-dione [II; X is $H_2$, Y is O, Z is CHCOCH$_3$] was prepared from 62.8 g. of progesterone and 19.5 g. of potassium cyanide according to the manipulative procedure described above in Example 1. The crude product which separated from the reaction mixture was collected and washed with methanol-water-ethyl acetate (4:1:1) to give 22.64 g. of 5α-cyanopregnane-3,20-dione which when recrystallized from methyl ethyl ketone was obtained in the form of colorless needles, M.P. 238.0–238.8° C. (corr.), $[\alpha]_D^{25}=+118°$ (1% in chloroform); infrared absorption at 3.44, 3.51, 4.51, 5.85 and 5.90μ.

EXAMPLE 6

*5β-Cyanopregnane-3,20-Dione*

[II; X is $H_2$, Y is O, Z is CHCOCH$_3$]

A second crop of solid product (27.37 g.) was obtained from the original reaction mixture of Example 5. This was recrystallized from methyl ethyl ketone to give 5β-cyanopregnane-3,20-dione, M.P. 199.4–205.2° C. (corr.), $[\alpha]_D^{25}=+92.6°$ (1% in chloroform); infrared absorption at 3.44, 3.53, 4.51, 5.83 and 5.90μ.

According to the procedures described in the foregoing examples potassium cyanide can be caused to react with testosterone acetate, 4-androstene-3,17-dione, 17α-ethynyl-4-androsten-17β-ol-3-one, cortisone, cortisone acetate, 17α-hydroxy-progesterone, hydrocortisone, desoxycorticosterone, desoxycorticosterone acetate or andrenosterone to give, respectively, 17β-acetoxy-5ξ-cyanoandrostan-3-one [II; X is $H_2$, Y is O, Z is CH(OCOCH$_3$-β)], 5ξ-cyanoandrostane-3,17-dione [II; X is $H_2$, Y is O, Z is C=O], 5ξ-cyano-17α-ethynylandrostan-17β-ol-3-one [II; X is $H_2$, Y is O, Z is C(OH-β)(C≡CH-α)], 5ξ-cyanopregnane-17α,21-diol-3,11,20-trione [II; X is O, Y is O, Z is C(OH-α)COCH$_2$OH], 21-acetoxy-5ξ-cyanopregnan-17α-ol-3,11,20-trione [II; X is O, Y is O, Z is

C(OH-α)COCH$_2$OCOCH$_3$]

5ξ-cyanopregnan-17α-ol-3,20-dione [II; X is $H_2$, Y is O, Z is C(OH-α)COCH$_3$], 5ξ-cyanopregnane-11β,17α,21-triol-3,20-dione [II; X is (H)(OH-β), Y is O, Z is

C(OH-α)COCH$_2$OH]

5ξ-cyanopregnan-21-ol-3,20-dione [II; X is $H_2$, Y is O, Z is CHCOCH$_2$OH], 21-acetoxy-5ξ-cyanopregnane-3,20-dione [II; X is $H_2$, Y is O, Z is CHCOCH$_2$OCOCH$_3$] or 5ξ-cyanoandrostane-3,11,17-trione [II; X is O, Y is O, Z is C=O].

5ξ-cyanoandrostan-17β-ol-3-one can be caused to react with chromic oxide in acetic acid solution to give 5ξ-cyanoandrostane-3,17-dione [II; X is $H_2$, Y is O, Z is C=O].

EXAMPLE 7

*3α-Amino-5α-Carboxyandrostane-3β,17β-Diol-(3,5-Lactam)*

[IV; R is H, X is $H_2$, Z is CH(OH-β)]

A mixture of 12.60 g. of 5α-cyanoandrostan-17β-ol-3-one (Example 1), 16.00 g. of sodium hydroxide, 600 ml. of water and 1200 ml. of dioxane was allowed to stand at room temperature for about fifteen hours. Acetic acid (25 ml.) was then added, and the mixture was concentrated to a volume of 200 ml. The product which had separated was filtered, washed with water and recrystallized twice from aqueous ethanol to give 3α-amino-5α-carboxyandrostane-3β,17β-diol-(3,5-lactam) in the form of colorless needles, M.P. 290.0–293.4° C. (corr.), $[\alpha]_D^{25}=+25.4°$ (1% in chloroform).

EXAMPLE 8

*3β-Amino-5β-Carboxyandrostane-3α,17β-Diol-(3,5-Lactam)*

[IV; R is H, X is $H_2$, Z is CH(OH-β)]

A mixture of 5β-cyanoandrostan-17β-ol-3-one (Example 2), 8.00 g. of sodium hydroxide, 300 ml. of water and 600 ml. of dioxane was allowed to stand at room temperature for about fifteen hours. Acetic acid (12 ml.) was added and the reaction mixture was concentrated: The solid material which separated was recrystallized twice from methanol to give 3β-amino-5β-carboxyandrostane-3α,17β-diol-(3,5-lactam) in the form of colorless prisms, M.P. 271.8–274.8° C. (corr.), $[\alpha]_D^{25}=+33.1°$ (1% in pyridine); infrared absorption at 2.92, 3.04, 3.42, 5.93, 6.80 and 6.88μ.

EXAMPLE 9

*3α,17β-Diacetoxy-3β-Amino-5β-Carboxyandrostane-(3,5-Lactam)*

[IV; R is CH$_3$CO, X is $H_2$, Z is CH(OCOCH$_3$-β)]

A mixture of 1.00 g. of 3β-amino-5β-carboxyandrostane-3α,17β-diol-(3,5-lactam), 5 ml. of pyridine and 2 ml. of acetic anhydride was heated for one hour on a steam bath. The resulting product was isolated and recrystallized three times from cyclohexane to give 3α,17β-diacetoxy - 3β-amino-5β-carboxyandrostane-(3,5-lactam) in the form of colorless needles, M.P. 187.2–189.4° C. (corr.), $[\alpha]_D^{25} = +22.9°$ (1% in chloroform); infrared absorption at 2.91, 3.42, 5.75–5.77 and 5.84μ.

EXAMPLE 10

*3β-Amino-5β-Carboxyandrostan-3α-Ol-17-One-(3,5-Lactam)*

[IV; R is H, X is $H_2$, Z is C=O]

A solution of 150 g. of chromic oxide in 2 ml. of water and 18 ml. of acetic acid was added to a stirred solution of 5.00 g. of 3β-amino-5β-carboxyandrostane-3α,17β-diol-(3,5-lactam) (Example 8) in 50 ml. of acetic acid. The reaction mixture was stirred for three hours, 5 ml. of methanol added, the mixture stirred for one-half hour and then added to 800 ml. of water. The mixture was extracted with three 200 ml. portions of methylene dichloride, and the extracts were washed with water, 5% sodium bicarbonate solution, dried over anhydrous magnesium sulfate and concentrated. The residue was recrystallized twice from acetonitrile to give 3β-amino-5β-carboxyandrostan-3α-ol-17-one-(3,5-lactam) in the form of colorless prisms, M.P. 238.8–241.2° C. (corr.), $$[\alpha]_D^{25} = +93.0°$$

(1% in chloroform); infrared adsorption at 2.92, 3.00 3.42, 5.74, 5.87, 6.79 and 6.92μ.

EXAMPLE 11

*3ξ-Amino-5ξ-Carboxy-17α-Methylandrostane-3ξ,17β-Diol-(3,5-Lactam) (Isomer A)*

[IV; R is H, X is $H_2$, Z is C(OH-β)(CH₃-α)]

A mixture of 12.79 g. of 5ξ-cyano-17α-methylandrostan-17β-ol-3-one (Isomer A) (Example 3) and 12.79 g. of potassium hydroxide in 600 ml. of ethanol was refluxed for one hour. Acetic acid (15 ml.) was added and the solvent was removed in vacuo. The residue was stirred with water and the solid product collected by filtration and dried at 65° C. in vacuo. The latter was dissolved in a mixture of 100 ml. of tetrahydrofuran and 300 ml. of chloroform, and chromatographed on a column of 600 g. of silica gel. The column was eluted with methylene dichloride-ether and methylene dichloride-ether-acetone mixtures and finally with methylene dichloride-acetone mixtures containing increasing amounts of acetone. Methylene dichloride-acetone (6:4 and 5:5) brought out the desired product which was recrystallized from aqueous methanol to give 3ξ-amino-5ξ-carboxy-17α-methylandrostane-3ξ,17β-diol-(3,5-lactam) (Isomer A), M.P. 278.4–280.0° C. (corr.), $[\alpha]_D^{25} = -26.0°$ (ethanol); infrared absorption at 3.05, 3.42, 5.92 and 6.85–6.90μ.

According to the procedures described in Examples 7, 8 or 11 5ξ-cyano-17α-ethynylandrostan-17β-ol-3-one, 5ξ-cyanopregnane-17α,21-diol-3,11,20-trione, 5ξ-cyanopregnane-11β,17α,21-triol-3,20-dione, 5ξ-cyanopregnan-21-ol-3,20-dione or 5ξ-cyanoandrostane-3,11,17-trione can be treated with sodium hydroxide or potassium hydroxide to give, respectively, 3ξ-amino-5ξ-carboxy-17α-ethynylandrostane-3ξ,17β-diol-(3,5-lactam) [IV; R is H, X is $H_2$, Z is C(OH-β)(C≡CH-α)], 3ξ-amino-5ξ-carboxypregnane-3ξ,17α,21-triol-11,20-dione-(3,5-lactam) [IV; R is H, X is O, Z is C(OH-α)COCH₂OH], 3ξ-amino-5ξ-carboxypregnane - 3ξ,11β,17α,21 - tetrol-20-one-(3,5-lactam) [IV; R is H, X is (H)(OH-β), Z is C(OH-α)COCH₂OH], 3ξ - amino - 5ξ - carboxypregnane - 3ξ,21-diol-20-one-(3,5-lactam) [IV; R is H, X is $H_2$, Z is CHCOCH₂OH], or 3ξ - amino - 5ξ - carboxyandrostan-3ξ-ol-11,17-dione-(3,5-lactam) [IV; R is H, X is O, Z is C=O].

EXAMPLE 12

*5α-Cyanoandrostane-3ξ,17β-Diol*

[II; X is $H_2$, Y is (H)(OH), Z is CH(OH-β)]

A solution of 11.34 g. of sodium borohydride in 50 ml. of water was added to a solution of 28.000 g. of 5α-cyanoandrostan-17β-ol-3-one (Example 1) in 500 ml. of methanol and 500 ml. of tetrahydrofuran. The reaction mixture was stirred for three hours while cooling in an ice bath and allowed to stand at room temperature for about fifteen hours. There was then added 15 ml. of acetic acid and the mixture was concentrated on a steam bath. The residue was stirred with water and the solid product collected by filtration to give 5α-cyanoandrostane-3ξ,17β-diol (a mixture of the 3β- and 3α-isomers).

The crude diol was added to 100 ml. of pyridine containing 50 ml. of acetic anhydride, and the mixture was heated for one-half hour on a steam bath and allowed to stand at room temperature for about fifteen hours. The acetylated product was isolated, dissolved in a mixture of 100 ml. of methylene dichloride, 100 ml. of ether and 100 ml. of pentane, and chromatographed on a column of 1000 g. of silica gel. The column was eluted with ether-methylene dichloride-pentane (3:1:6), and two products were isolated: 3β,17β-diacetoxy-5α-cyanoandrostane [II; X is $H_2$, Y is (H)(OCOCH₃-β), Z is CH(OCOCH₃-β)], M.P 193.5–195.0° C. (uncorr.) when recrystallized from methanol; and 3α,17β-diacetoxy-5α-cyanoandrostane [II; X is $H_2$, Y is (H)(OCOCH₃-α), Z is CH(OCOCH₃-β)], M.P. 205–206° C. (uncorr.), when recrystallized from acetonitrile.

The isomeric mixture of diols could also be separated as follows: 5α-cyanoandrostane-3ξ,17β-diol (obtained by the reduction of 31.5 g. of 5α-cyanoandrostan-17β-ol-3-one with sodium borohydride) was refluxed with 450 ml. of ethanol and 150 ml. of concentrated hydrochloric acid for one-half hour. The reaction mixture was diluted with 3 liters of water, and the solid product which separated was collected by filtration and dried to give 9.40 g. of 5α-cyanoandrostane-3β,17β-diol, M.P. 246–248° C. (uncorr.).

The acidic filtrate was made alkaline with sodium hydroxide and allowed to stand overnight. The solid material which separated was collected, washed and dried, to give 5α-cyanoandrostane-3α,17β-diol, M.P. 241–242.5° C. (uncorr.).

EXAMPLE 13

5β-cyanoandrostane-3ξ,17β-diol [II; X is $H_2$, Y is (H)(OH), Z is CH(OH-β)] was prepared from 31.5 g. of 5β-cyanoandrostan-17β-ol-3-one (Example 2) and 11.34 g. of sodium borohydride according to the manipulative procedure described above in Example 12.

The product was obtained in the form of a mixture of the 3α- and 3β-epimers.

EXAMPLE 14

3ξ - acetoxy - 5ξ - cyano-17α-methylandrostan-17β-ol (Isomer A) [II; X is $H_2$, Y is (H)(OCOCH₃), Z is C(OH-β)(CH₃-α)] was prepared from 17.18 g. of 5ξ-cyano-17α-methylandrostan-17β-ol-3-one (Isomer A) (Example 3) and 5.67 g. of sodium brohydride, followed by acetylation with acetic anhydride in pyridine, according to the manipulative procedure described above in Example 12. The product was dissolved in methylene dichloride, chromatographed on a column of 1500 g. of silica gel, and the column was eluted with ether-methylene dichloride-pentane (5:1:4). The later fractions of high melting material (M.P. 220–230° C.) were recrystallized several times from methanol to give 3ξ-acetoxy - 5ξ-cyano-17α-methylandrostan-17β-ol (Isomer A), M.P. 232.2–233.0° C. (corr.), $[\alpha]_D^{25} = +28.5°$ (1% in chloroform); ultraviolet absorption at 2.82, 3.40, 4.49, 5.83, 7.88, 8.01, 8.16 and 9.83μ.

According to the procedure described above in Example 12, 5α-cyanopregnane-3,20-dione (Example 5), 5ξ-cyano-17α-ethynylandrostan-17β-ol-3-one or 5ξ-cyanopregnane-11β,17α,21-triol-3,20-dione can be reduced with sodium borohydride to give, respectively, 5α-cyanopregnan-3ξ-ol-20-one [II; X is $H_2$, Y is (H)(OH), Z is CHCOCH$_3$], 5ξ-cyano-17α-ethynylandrostane-3ξ,17β-diol [II; X is $H_2$, Y is (H)(OH), Z is

C(OH-β)(C≡CH-α)]

or 5ξ-cyanopregnane-3ξ,11β,17α,21-tetrol-20-one [II; X is (H)(OH-β), Y is (H)(OH, Z is

C(OH-α)COCH$_2$OH]

EXAMPLE 15

*5α-Carboxyandrostane-3α,17β-Diol-(3,5-Iminolactone)*

[V; R' is H, X is $H_2$, Z is CH(OH-β)]

A mixture of 10.35 g. of 5α-cyanodrostane-3α,17β-diol (Example 12), 180 ml. of ethanol and 60 ml. of concentrated hydrochloric acid was refluxed for one-half hour. The reaction mixture was added to 2 liters of water, filtered, and the filtrate was made basic with ammonium hydroxide. The solid product was collected by filtration, washed with water and dissolved in 300 ml. of methylene dichloride. The methylene dichloride solution was washed with water and dried over anhydrous magnesium sulfate and concentrated to give 9.60 g. of 5α-carboxyandrostane-3α,17β-diol-(3,5-iminolactone), M.P. 213.2–215.0° C. (corr.) when recrystallized from acetonitrile; $[α]_D^{25} = +17.5°$ (1% in chloroform).

5α-carboxyandrostane-3α,17β-diol-(3,5-iminolactone), when administered orally to renal hypertensive rats at a dose level of 100 mg./kg., brought about a drop in blood pressure from 173 to 156 mm. Hg with maximum response in one hour.

EXAMPLE 16

*17β-Acetoxy-5α-Carboxyandrostan-3α-Ol-(3,5-acetyliminolactone)*

[V; R' is COCH$_3$, X is $H_2$, Z is CH(OCOCH$_3$-β)]

A mixture of 3.00 g. of 5α-carboxyandrostane-3α,17β-diol-(3,5-iminolactone) (Example 15), 15 ml. of acetic anhydride and 30 ml. of pyridine was heated for ninety minutes on a steam bath and then added to 400 ml. of water. The resulting product was separated and recrystallized from methanol to give 17β-acetoxy-5α-carboxyandrostan-3α-ol-(3,5-acetyliminolactone) in the form of colorless prisms, M.P. 224.0–226.2° C. (corr.), $[α]_D^{25} = -10.9°$ (1% in chloroform).

17β-acetoxy-5α-carboxyandrostan-3α-ol-(3,5-acetyliminolactone) showed antihypertensive activity similar to that of the unacetylated product of Example 15.

EXAMPLE 17

*5β-Carboxyandrostane-3β,17β-Diol-(3,5-iminolactone)*

[V; R' is H, X is $H_2$, Z is CH(OH-β)]

The 5β-cyanoandrostane-3ξ,17β-diol obtained in Example 13 above was refluxed for one-half hour with 450 ml. of ethanol and 150 ml. of concentrated hydrochloric acid. The reaction mixture was added to 4 liters of water and the precipitated solid was collected by filtration and washed well with water. This product, M.P. 225–228° C. (uncorr.), was 5β-cyanoandrostane-3ξ,17β-diol.

The acidic filtrate was made basic with ammonium hydroxide and there separated 18.54 g. of 5β-carboxyandrostane-3β,17β-diol-(3,5-iminolactone), M.P. 217.6–221.2° C. (corr.) when recrystallized from methyl ethyl ketone, $[α]_D^{25} = -2.4°$ (1% in chloroform); infrared absorption at 3.06, 3.45, 6.02, 6.18, 6.81 and 6.89μ.

5β-carboxyandrostane-2β,17β-diol-(3,5-iminolactone), when administered orally to renal hypertensive rats at a dose level of 100 mg./kg., brought about a drop in blood pressure of from 187 to 156 mm. Hg with maximum response in six hours.

EXAMPLE 18

*17β-acetoxy-5β-carboxyandrostan-3β-ol-(3,5-acetyliminolactone)* [V; R' is COCH$_3$, X is $H_2$, Z is

CH(OCOCH$_3$-β)]

was prepared from 3.17 g. of 5β-carboxyandrostane-3β,17β-diol-(3,5-iminolactone) (Example 17) and 15 ml. of acetic anhydride in 30 ml. of pyridine. The product was recrystallized from methanol to give 17β-acetoxy-5β-carboxyandrostan-3β-ol-(3,5-acetyliminolactone) in the form of colorless rods, M.P. 230.4–233.0° C. (corr.) $[α]_D^{25} = +14.1°$ (1% in chloroform); infrared absorption at 3.43, 5.79, 5.97 and 8.03μ.

According to the procedure described above in Example 15, 5α-cyanopregnan-3ξ-ol-20-one, 5ξ-cyano-17α-ethynylandrostane-3ξ,17β-diol or 5ξ-cyanopregnane-3ξ,11β,17α,-21-tetrol-20-one can be cyclized with hydrochloric acid to give, respectively, 5α-carboxypregnan-3α-ol-20-one-(3,5-iminolactone) [V; R' is H, X is $H_2$, Z is CHCOCH$_3$], 5ξ-carboxy-17α-ethynylandrostane-3ξ,17β-diol-(3,5-iminolactone) [V; R' is H, X is $H_2$, Z is C(OH-β)(C≡CH-α)] or 5ξ-carboxypregnane-3ξ,11β,17α,21-tetrol-20-one-(3,5-iminolactone) [V; R' is H, X is (H)(OH-β), Z is C(OH-α)COCH$_2$OH].

EXAMPLE 19

*5α-Carboxyandrostane-3α,17β-Diol-(3,5-Lactone)*

[VI; X is $H_2$, Z is CH(OH-β)]

A mixture of 6.03 g. of 3α,17β-diacetoxy-5α-cyanoandrostane (Example 12), 30 ml. of concentrated hydrochloric acid and 90 ml. of ethanol was refluxed for two days. The reaction mixture was cooled, and the solid product was collected by filtration and washed with aqueous ethanol to give 4.13 g. of 5α-carboxyandrostane-3α,17β-diol-(3,5-lactone) in the form of colorless needles, M.P. 282.0–283.8° C. (corr.) when recrystallized from ethanol; $[α]_D^{25} = +16.5°$ (1% in chloroform).

5α-carboxyandrostane-3α,17β-diol-(3,5-lactone) was also prepared as follows: 5α-carboxyandrostane-3α,17β-diol-(3,5-iminolactone) (Example 15) (41.0 g.) and 200 ml. of concentrated hydrochloric acid in 600 ml. of ethanol refluxed forty hours and the product isolated as described above gave 38.6 g., M.P. 237–280° C. (uncorr.).

The 17-acetate of 5α-carboxyandrostane-3α,17β-diol-(3,5-lactone) had the M.P. 199–201° C. (uncorr.).

EXAMPLE 20

*5β-Carboxyandrostane-3β,17β-Diol-(3,5-Lactone)*

[VI; X is $H_2$, Z is CH(OH-β)]

A mixture of 8.0 g. of 5β-carboxyandrostane-3β,17β-diol-(3,5-iminolactone) (Example 17) and 900 ml. of dilute hydrochloric acid (prepared from 40 ml. of concentrated hydrochloric acid) was heated on a steam bath for two days. The reaction mixture was cooled, and the solid product was collected by filtration, washed with water, dried at 170° C. in vacuo and recrystallized twice from acetonitrile to give 5β-carboxyandrostane-3β,17β-diol-(3,5-lactone), M.P. 198.2–200.2° C. (corr.); $[α]_D^{25} = -2.8°$ (1% in chloroform); infrared absorption at 2.89, 3.45, 5.65, 5.72, 6.82 and 6.90μ.

According to the procedure described above in Examples 19 and 20, 5α-cyanopregnan-3ξ-ol-20-one, 5ξ-cyano-17α-ethynylandrostane-3ξ,17β-diol or 5ξ-cyanopregnane-3ξ,11β,17α,21-tetrol-20-one can be cyclized and hydrolyzed with hydrochloric acid to give, respectively, 5α-carboxypregnan-3α-ol-20-one-(3,5-lactone) [VI; X is $H_2$, Z is CH(OH-β)], 5ξ-carboxy-17α-ethynylandrostane-3ξ,17β-diol-(3,5-lactone) [VI; X is $H_2$, Z is C(OH-β)-(C≡CH-α)] or 5ξ-carboxypregnane-3ξ-11β,17α,21-tetrol- 20-one-(3,5-lactone) [VI; X is (H)(OH-$\beta$), Z is C(OH-$\alpha$)(COCH$_2$OH)].

EXAMPLE 21

17$\beta$-Acetoxy-3$\alpha$,5$\alpha$-Epoxyvinylideneandrostane

[VII; X is H$_2$, Z is CH(OCOCH$_3$-$\beta$)]

Methylmagnesium bromide (200 ml. of 3 molar solution in ether) was added to a solution of 12.61 g. of the 17-acetate of 5$\alpha$-carboxyandrostane-3$\alpha$,17$\beta$-diol-(3,5-lactone) (Example 19) in 1000 ml. of tetrahydrofuran. The reaction mixture was refluxed for forty hours and then added to ice water containing 100 ml. of concentrated hydrochloric acid. The product was extracted with ether, and the ether extracts were washed with water and saturated sodium chloride solution, dried over anhydrous magnesium sulfate and concentrated. To the residue was added 50 ml. of pyridine and 25 ml. of acetic anhydride, and the mixture was heated for two hours on a steam bath and allowed to stand at room temperature for about fifteen hours. The reaction mixture was added to water, and the product was extracted with methylene dichloride, washed with dilute hydrochloric acid and saturated sodium bicarbonate solution, dried over anhydrous magnesium sulfate and concentrated. The residue was chromatographed on a column of 700 g. of silica gel, and the column was eluted with ether-methylene dichloride-pentane (1:1:8) to give 6.89 g. of 17$\beta$-acetoxy-3$\alpha$,5$\alpha$-epoxyvinylideneandrostane, M.P. 158.8–161.4° C. (corr.) when recrystallized from acetonitrile, $[\alpha]_D^{25}$=+10.1° (1% in chloroform).

EXAMPLE 22

5$\alpha$-Hydroxymethylandrostane-3$\alpha$,17$\beta$-Diol

[VIII; R is H, R" is H, X is H$_2$, Z is CH(OH-$\beta$)]

Lithium aluminum hydride (11.37 g.) in 1500 ml. of tetrahydrofuran was placed in a Soxhlet apparatus. 5$\alpha$-carboxyandrostane-3$\alpha$,17$\beta$-diol-(3,5-lactone) (Example 19) (19.08 g.) was placed in the thimble and the mixture was refluxed for sixteen hours. The reaction mixture was cooled, 25 ml. of water was added dropwise, the mixture stirred for one-half hour, then heated to reflux and filtered. The filtrate was concentrated in vacuo to give 18.77 g. of 5$\alpha$-hydroxymethylandrostane-3$\alpha$,17$\beta$-diol, M.P. 256–265° C. (uncorr.); infrared absorption at 2.98 and 3.43$\mu$.

A mixture of 2.05 g. of 5$\alpha$-hydroxymethylandrostane-3$\alpha$,17$\beta$-diol, 20 ml. of pyridine and 10 ml. of acetic anhydride was heated for two hours on a steam bath. The product was isolated and recrystallized twice from ethyl acetate to give 3$\alpha$,17$\beta$-diacetoxy-5$\alpha$-acetoxymethylandrostane [VIII; R is CH$_3$CO, R" is COCH$_3$, X is H$_2$, Z is CH(OCOCH$_3$-$\beta$)], M.P. 224.0–225.2° C. (corr.), $[\alpha]_D^{25}$=+5.6° (1% in chloroform).

3$\alpha$,17$\beta$-diacetoxy-5$\alpha$-acetoxymethylandrostane, when administered subcutaneously to rats at a dose level of 11.2 mg./kg. per day for nine days, showed evidence of estrogenic activity.

EXAMPLE 23

3$\alpha$,17$\beta$-Diformyloxy-5$\alpha$-Formyloxymethylandrostane

[VIII; R is HCO, R" is COH, X is H$_2$, Z is CH(OCOH-$\beta$)]

A mixture of 4.08 ml. of acetice anhydride and 19.2 ml. of formic acid was heated at 50–60° C. for two hours. 5$\alpha$-hydroxymethylandrostane-3$\alpha$,17$\beta$-diol (Example 22) (9.66 g.) was then added and the mixture was stirred at 70° C. for about fifteen hours. The reaction mixture was added to 1 liter of water and extracted with three 250 ml. portions of methylene dichloride. The methylene dichloride extracts were washed with 500 ml. of water and 500 ml. of 5% sodium bicarbonate solution, dried over anhydrous magnesium sulfate and concentrated. The residue was recrystallized twice from a methylene dichloride-methanol mixture to give 3$\alpha$,17$\beta$-diformyloxy-5$\alpha$-formyloxymethylandrostane, M.P. 174.8–175.4° C. (corr.), $[\alpha]_D^{25}$=—1.3° (1% chloroform); infrared absorption at 3.44, 5.82, 6.73, 6.85, 6.95 and 8.50$\mu$.

EXAMPLE 24

5$\beta$-Hydroxymethylandrostane-3$\beta$,17$\beta$-Diol

[VIII; R is H, R" is H, X is H$_2$, Z is CH(OH-$\beta$)]

A solution of 15.76 g. of 5$\beta$-carboxyandrostane-3$\beta$,17$\beta$-diol-(3,5-lactone) (Example 20) in 250 ml. of tetrahydrofuran was added dropwise to a solution of 9.48 g. of lithium aluminum hydride in 750 ml. of tetrahydrofuran in a nitrogen atmosphere. The reaction mixture was refluxed for four hours and then allowed to stand at room temperature for three days. A mixture of 19 ml. of water and 10 ml. of tetrahydrofuran was added dropwise, the mixture heated to reflux, filtered and concentrated in vacuo, to give 14.41 g. of 5$\beta$-hydroxymethylandrostane-3$\beta$,17$\beta$-diol, M.P. 187–208° C. (uncorr.).

A mixture of 14.41 g. of 5$\beta$-hydroxymethylandrostane-3$\beta$,17$\beta$-diol, 25 ml. of acetic anhydride and 50 ml. of pyridine was heated on a steam bath for two hours. The reaction mixture was added to 800 ml. of water, and the solid product was collected by filtration and recrystallized three times from methanol to give 3$\beta$,17$\beta$-diacetoxy-5$\beta$-acetoxymethylandrostane [VIII; R is CH$_3$CO, R" is COCH$_3$, X is H$_2$, Z is CH(OCOCH$_3$-$\beta$)], colorless needles, M.P. 133.2–134.2° C. (corr.), $[\alpha]_D^{25}$=—2.2° (1% in chloroform).

EXAMPLE 25

3$\alpha$,5$\alpha$-Epoxymethanoandrostan-3$\beta$-Ol-17-One

[IX; X is H$_2$, Z is C=O]

A mixture of 6.44 g. of 5$\alpha$-hydroxymethylandrostane-3$\alpha$,17$\beta$-diol (Example 22), 8.28 g. of N-bromoacetamide, 400 ml. of tertiary-butyl alcohol, 40 ml. of pyridine and 40 ml. of water was kept for about two days at room temperature with occasional stirring. The reaction mixture was then added to 1 liter of water and extracted twice with 500 ml. of ether. The ether extracts were washed with 200 ml. of 2 N hydrochloric acid, 500 ml. of water and 500 ml. of saturated sodium chloride solution, dried over anhydrous magnesium sulfate and concentrated. The residue was recrystallized four times from acetonitrile to give 3$\alpha$, 5$\alpha$-epoxymethanoandrostan-3$\beta$-ol-17-one in the form of colorless needles, M.P. 209.2–212.8° C. (corr.), $[\alpha]_D^{25}$=—111.7° (1% in chloroform).

3$\alpha$,5$\alpha$-epoxymethanoandrostan-3$\beta$-ol-17-one can be caused to react with methylmagnesium bromide in ether solution to give 3$\alpha$,5$\alpha$-epoxymethano-17$\alpha$-methylandrostane-3$\beta$,17$\beta$-diol [IX; X is H$_2$, Z is C(OH-$\beta$)(CH$_3$-$\alpha$)].

EXAMPLE 26

4$\alpha$,5$\beta$-Methanoandrostane-3,17-Dione

[X; X is H$_2$, Z is C=O]

A mixture of 3.34 g. of 3$\alpha$,5$\alpha$-epoxymethandrostan-3$\beta$-ol-17-one (Example 25), 3.80 g. of p-toluenesulfonyl chloride and 15 ml. of pyridine was heated on a steam bath for eight hours. The reaction mixture was added to 400 ml. of water and extracted with methylene dichloride. The methylene dichloride extracts were washed with 2 N hydrochloric acid and 5% sodium bicarbonate solution, dried over anhydrous magnesium sulfate and concentrated. The residue was chromatographed on a column of 150 g. of silica gel, and the column was eluted first with ether-methylene dichloride-pentane (2:1:7), and then with ether-methylene dichloride-pentane (3:1:6). The second eluant brought out the desired product which was recrystallized first from ethyl acetate-hexane and then from ethyl acetate-cyclohexane to give 4$\alpha$,5$\alpha$-methanoandrostane-3,17-dione in the form of colorless rods, M.P.

156.8–158.2° C. (corr.), $[\alpha]_D^{25} = +76.3°$ (1% in chloroform).

I claim:
1. A compound of the formula

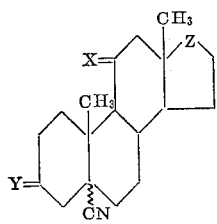

wherein X is a member of the group consisting of $H_2$, (H)(OH) and O;
Y is a member of the group consisting of (H)(OH) and (H)(OAcyl);
and Z is a member of the group consisting of

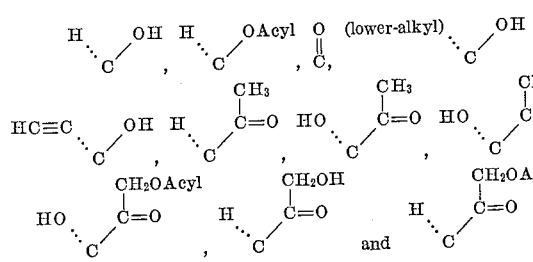

Acyl in each instance being a carboxylic acyl radical having from one to ten carbon atoms and a molecular weight less than about 200.

2. 5ξ-cyanoandrostane-3ξ,17β-diol.
3. 3ξ-acetoxy-5ξ-cyano-17α-methylandrostan-17β-ol.
4. A compound of the formula

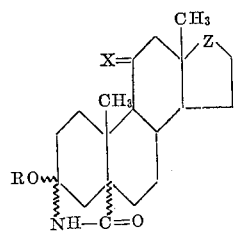

wherein R is selected from the group consisting of hydrogen and Acyl,
X is a member of the group consisting of $H_2$, (H)(OH) and O;
and Z is a member of the group consisting of

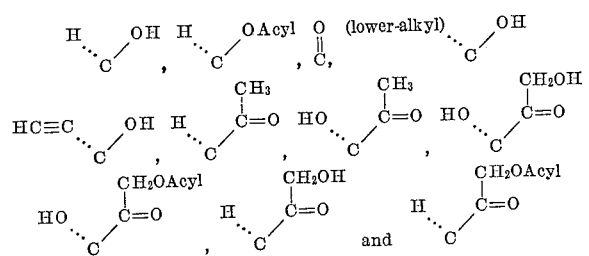

Acyl in each instance being a carboxylic acyl radical having from one to ten carbon atoms and a molecular weight less than about 200.

5. 3ξ - amino - 5ξ - carboxyandrostane-3ξ,17β-diol-(3,5-lactam).
6. 3ξ,17β - diacetoxy - 3ξ-amino-5ξ-carboxyandrostane-(3,5-lactam).

7. 3ξ - amino - 5ξ - carboxyandrostan-3ξ-ol-17-one-(3,5-lactam).
8. 3ξ - amino - 5ξ - carboxy - 17α-methylandrostane-3ξ,17β-diol-(3,5-lactam).
9. The process of preparing a 3-amino-5-carboxy-steroid 3,5-lactam which comprises treating with a strong base in an aqueous-organic medium a compound of the formula

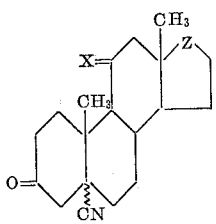

wherein X is a member of the group consisting of $H_2$, (H)(OH) and O;
and Z is a member of the group consisting of

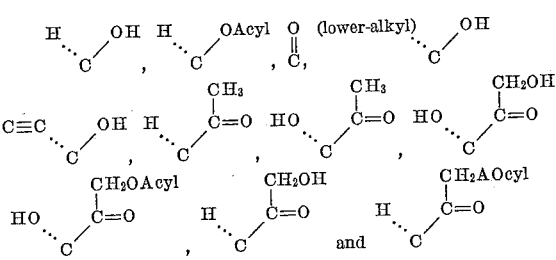

Acyl in each instance being a carboxylic acyl radical having from one to ten carbon atoms and a molecular weight less than about 200.

10. A compound of the formula

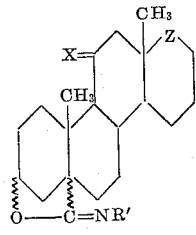

wherein R' is selected from the group consisting of hydrogen and Acyl, X is a member of the group consisting of $H_2$, (H)(OH) and O;
and Z is a member of the group consisting of

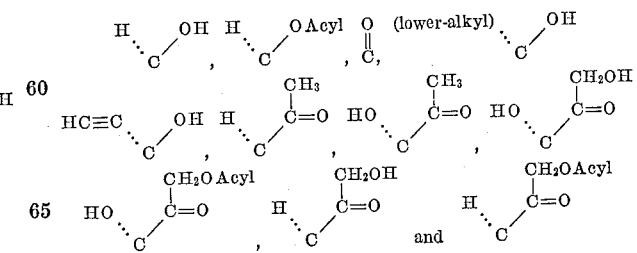

Acyl in each instance being a carboxylic acyl radical having from one to ten carbon atoms and a molecular weight less than about 200.

11. 5ξ - carboxyandrostane-3ξ,17β-diol-(3,5-iminolactone).
12. 17β - acetoxy-5ξ-carboxyandrostan-3ξ-ol-(3,5-acetyliminolactone).

13. A compound of the formula

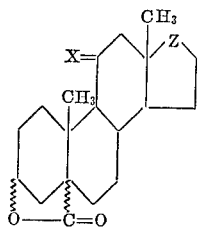

wherein X is a member of the group consisting of H₂, (H)(OH) and O;
and Z is a member of the group consisting of

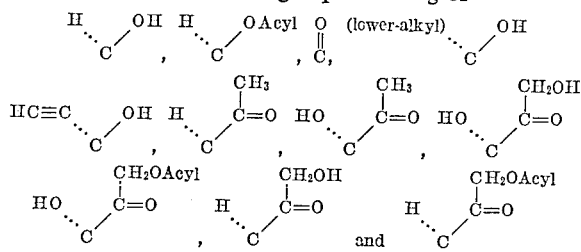

Acyl in each instance being a carboxylic acyl radical having from one to ten carbon atoms and a molecular weight less than about 200.

14. 5ξ-carboxyandrostane-3ξ,17β-diol-(3,5-lactone).

15. The process for preparing a member of the group consisting of steroid-3,5-iminolactones and steroid-3,5-lactones which comprises heating with a strong acid a compound of the formula

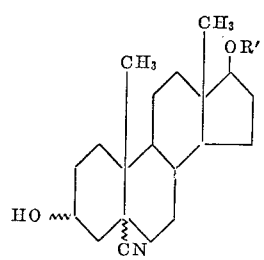

wherein R' is selected from the group consisting of hydrogen and Acyl, Acyl being a carboxylic acyl radical having from one to ten carbon atoms and a molecular weight less than about 200.

16. A compound of the formula

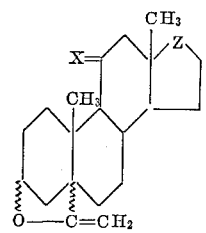

wherein X is a member of the group consisting of H₂, (H)(OH) and O;
and Z is a member of the group consisting of

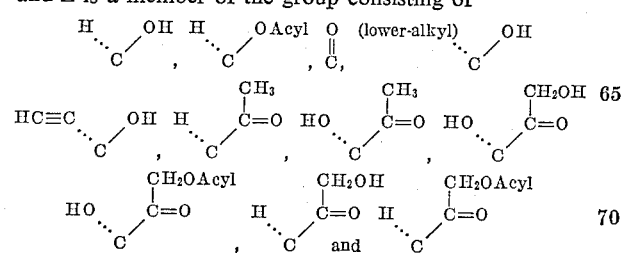

Acyl in each instance being a carboxylic acyl radical having from one to ten carbon atoms and a molecular weight less than about 200.

17. 17β-acetoxy-3ξ,5ξ-epoxyvinylideneandrostane.

18. A compound of the formula

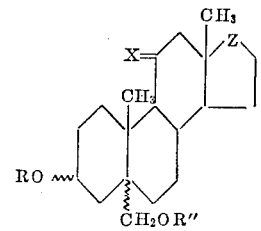

wherein R and R'' are selected from the group consisting of hydrogen and Acyl, X is a member of the group consisting of H₂, (H)(OH) and O;
and Z is a member of the group consisting of

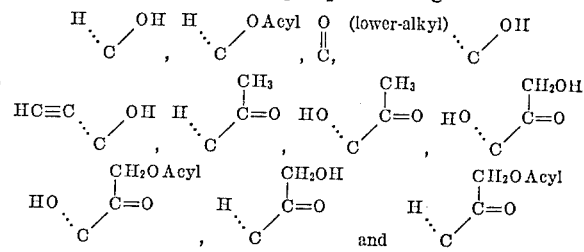

Acyl in each instance being a carboxylic acyl radical having from one to ten carbon atoms and a molecular weight less than about 200.

19. 5ξ-hydroxymethylandrostane-3ξ,17β-diol.
20. 3ξ,17β-diacetoxy-5ξ-acetoxymethylandrostane.
21. 3ξ,17β-diformyloxy-5ξ-formyloxymethylandrostane.
22. A compound of the formula

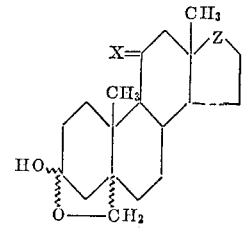

wherein X is a member of the group consisting of H₂, (H)(OH) and O;
and Z is a member of the group consisting of

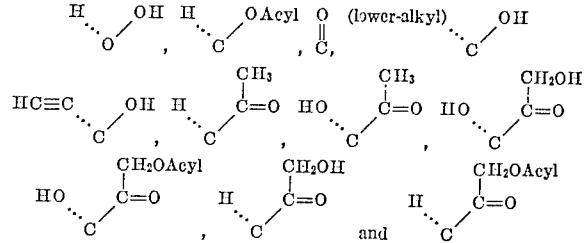

Acyl in each instance being a carboxylic acyl radical having from one to ten carbon atoms and a molecular weight less than about 200.

23. 3ξ,5ξ-epoxymethanoandrostan-3ξ-ol-17-one.
24. A compound of the formula

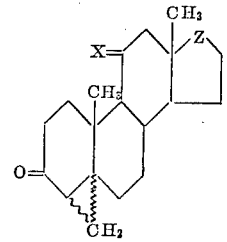

wherein X is a member of the group consisting of H₂, (H)(OH) and O;

and Z is a member of the group consisting of
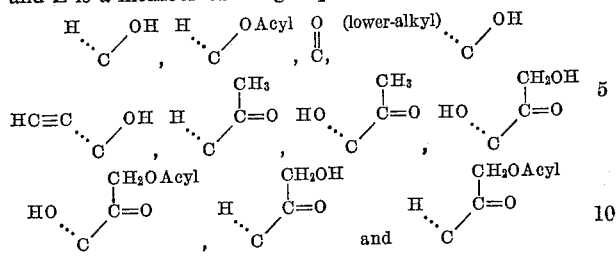
Acyl in each instance being a carboxylic acyl radical having from one to ten carbon atoms and a molecular weight less than about 200.
25. 4ξ,5ξ-methanoandrostane-3,17-dione.
References Cited in the file of this patent
Bowers: J. Org. Chem. 26 (1961), pp. 2043–47.
Nagata et al.: J. Org. Chem. 26 (1961), pp. 2413–20.

UNITED STATES PATENT OFFICE
CERTIFICATE OF CORRECTION

Patent No. 3,120,515                          February 4, 1964

Robert G. Christiansen

It is hereby certified that error appears in the above numbered patent requiring correction and that the said Letters Patent should read as corrected below.

Column 3, lines 3 to 12, formula V, for that portion of the formula reading

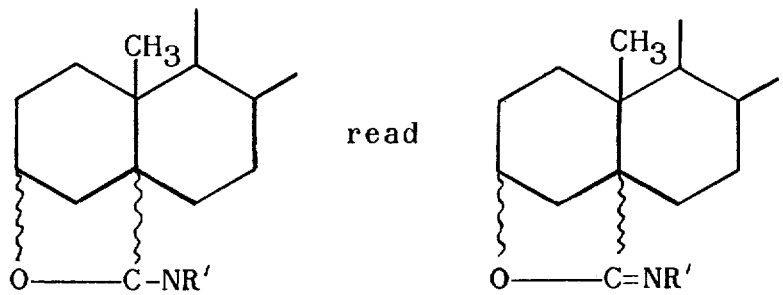

same column 3, formula VII, for that portion of the formula reading

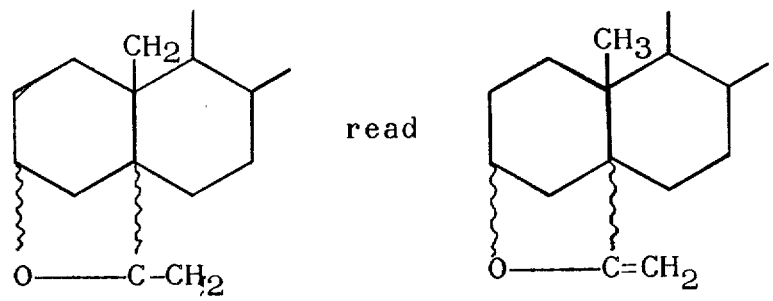

column 4, line 54, for "17β-cinnamoyloxy-" read -- 17β-caproyloxy- --; column 5, line 16, for "-4-androstan-" read -- -4-androsten- --; column 7, line 15, for "150 g." read -- 1.50 g. --; column 8, line 62, for "brohydride" read -- borohydride --; column 9, line 18, for "5α-cyanodrostane-" read -- 5α-cyanoandrostane- --; line 74, for "-2β,17β-" read -- -3β,17β- --; column 10, line 48, for "237-280° C." read -- 273-280° C. --; column 12, line 60, for "3α,5α-epoxymethandrostan-" read -- 3α,5α-epoxymethanoandrostan- --; column 14, lines 31 to 34, the right-hand member, for

same column 14, line 53, for "consist-" read -- consisting --; column 16, lines 48 to 50, the left-hand member, for

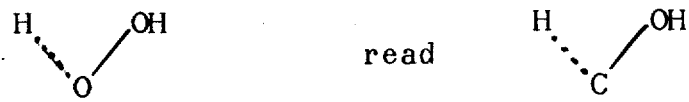

Signed and sealed this 23rd day of June 1964.

(SEAL)
Attest:

ERNEST W. SWIDER
Attesting Officer

EDWARD J. BRENNER
Commissioner of Patents